(12) United States Patent
Arimilli et al.

(10) Patent No.: US 6,615,320 B2
(45) Date of Patent: *Sep. 2, 2003

(54) STORE COLLAPSING MECHANISM FOR SMP COMPUTER SYSTEM

(75) Inventors: Ravi Kumar Arimilli, Austin, TX (US); John Steven Dodson, Pflugerville, TX (US); Guy Lynn Guthrie, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 180 days.

This patent is subject to a terminal disclaimer.

(21) Appl. No.: 09/782,580

(22) Filed: Feb. 12, 2001

(65) Prior Publication Data

US 2002/0112130 A1 Aug. 15, 2002

(51) Int. Cl.[7] ................................................ G06F 12/08
(52) U.S. Cl. ........................ 711/141; 711/144; 711/146
(58) Field of Search ................................ 711/141, 144, 711/146

(56) References Cited

U.S. PATENT DOCUMENTS 6,351,790 B1 * 2/2002 Jones .......................... 711/141

2002/0073281 A1 * 6/2002 Gaither ....................... 711/122

OTHER PUBLICATIONS

09/782580, Related App., Filed: Feb. 12, 2001.

* cited by examiner

Primary Examiner—Reginald G. Bragdon
Assistant Examiner—Midys Inoa
(74) Attorney, Agent, or Firm—Casimer K. Salys; Bracewell & Patterson, L.L.P.

(57) ABSTRACT

A method of handling a write operation in a multiprocessor computer system wherein each processing unit has a respective cache, by determining that a new value for a store instruction is the same as a current value already contained in the memory hierarchy, and discarding the store instruction without issuing any associated cache operation in response to this determination. When a store hit occurs, the current value is retrieved from the local cache. When a store miss occurs, the current value is retrieved from a remote cache by issuing a read request. The comparison may be performed using a portion of the cache line which is less than a granule size of the cache line. A store gathering queue can be use to collect pending store instructions that are directed to different portions of the same cache line.

18 Claims, 3 Drawing Sheets

STORE COLLAPSING MECHANISM FOR SMP COMPUTER SYSTEM

CROSS-REFERENCES TO RELATED APPLICATIONS

The present invention is related to U.S. patent application Ser. No. 09/782,581 entitled "MECHANISM FOR COLLAPSING STORE MISSES IN AN SMP COMPUTER SYSTEM", filed concurrently with this application, which is hereby incorporated.

BACKGROUND OF THE INVENTION

1. Field of the Invention

The present invention generally relates to computer systems, specifically to a method of maintaining cache coherency in a multiprocessor computer system, and more particularly to an efficient method of managing store operations in a computer memory hierarchy having multiple caches.

2. Description of Related Art

The basic structure of a conventional multiprocessor computer system 10 is shown in FIG. 1. Computer system 10 has several processing units, two of which 12a and 12b are depicted, which are connected to various peripheral devices, including input/output (I/O) devices 14 (such as a display monitor, keyboard, graphical pointer (mouse), and a permanent storage device or hard disk), memory device 16 (such as random access memory or RAM) that is used by the processing units to carry out program instructions, and firmware 18 whose primary purpose is to seek out and load an operating system from one of the peripherals (usually the permanent memory device) whenever the computer is first turned on. Processing units 12a and 12b communicate with the peripheral devices by various means, including a generalized interconnect or bus 20, or direct memory access channels (not shown). Computer system 10 may have many additional components which are not shown, such as serial, parallel, and universal system bus (USB) ports for connection to, e.g., modems, printers or scanners. There are other components that might be used in conjunction with those shown in the block diagram of FIG. 1; for example, a display adapter might be used to control a video display monitor, a memory controller can be used to access memory 16, etc. The computer can also have more than two processing units.

In a symmetric multiprocessor (SMP) computer, all of the processing units are generally identical, that is, they all use a common set or subset of instructions and protocols to operate, and generally have the same architecture. A typical architecture is shown in FIG. 1. A processing unit includes a processor core 22 having a plurality of registers and execution units, which carry out program instructions in order to operate the computer. An exemplary processing unit includes the PowerPC™ processor marketed by International Business Machines Corp. The processing unit can also have one or more caches, such as an instruction cache 24 and a data cache 26, which are implemented using high speed memory devices. Caches are commonly used to temporarily store values that might be repeatedly accessed by a processor, in order to speed up processing by avoiding the additional latency of loading the values from memory 16. These caches are referred to as "on-board" when they are integrally packaged with the processor core on a single integrated chip 28. Each cache is associated with a cache controller (not shown) that manages the transfer of data and instructions between the processor core and the cache memory.

A processing unit can include additional caches, such as cache 30, which is referred to as a level 2 (L2) cache since it supports the on-board (level 1) caches 24 and 26. In other words, cache 30 acts as an intermediary between memory 16 and the on-board caches, and can store a much larger amount of information (instructions and data) than the on-board caches can, but at a longer access penalty. For example, cache 30 may be a chip having a storage capacity of 512 kilobytes, while the processor may be an IBM PowerPC™ 604-series processor having on-board caches with 64 kilobytes of total storage. Cache 30 is connected to bus 20, and all loading of information from memory 16 into processor core 22 must come through cache 30. Although FIG. 1 depicts only a two-level cache hierarchy, multi-level cache hierarchies can be provided where there are many levels (L3, L4, etc.) of serially connected caches.

In a multi-level cache, if a copy of a value is in every level of the cache, the cache hierarchy is referred to as being "inclusive." It is not necessary, however, to keep a copy of each value in the lower levels, and an inclusivity bit field may be added to the caches to indicate whether or not the cache is inclusive. For example, a three-level cache structure might provide an L3 cache which was not inclusive, such that a value residing in the L2 cache might not be present in the L3 cache. In this example, if an L2 cache issues a read command for a value that is not present in any of the caches of that processing unit, it can be passed to that L2 cache without (necessarily) loading it into the L3 cache.

In an SMP computer, it is important to provide a coherent memory system, that is, to cause write operations to each individual memory location to be serialized in some order for all processors. By way of example, assume a location in memory is modified by a sequence of write operations to take on the values: 1, 2, 3, 4. In a cache coherent system, all processors will observe the writes to a given location to take place in the order shown. However, it is possible for a a processing element to miss a write to the memory location. A given processing element reading the memory location could see the sequence 1, 3, 4, missing the update to the value 2. A system that implements these properties is said to be "coherent". Nearly all coherency protocols operate only to the granularity of the size of a cache block. That is to say, the coherency protocol controls the movement of and write permissions for operand data or instructions on a cache block basis, and not separately for each individual memory location.

There are a number of protocols and techniques for achieving cache coherence that are known to those skilled in the art. All of these mechanisms for maintaining coherency require that the protocols allow only one processor to have a "permission" that allows a write operation to a given memory location (cache block) at any given point in time. As a consequence of this requirement, whenever a processing element attempts to write to a memory location, it must first inform all other processing elements of its desire to write the location and receive permission from all other processing elements to carry out the write.

To implement cache coherency in a system, the processors communicate over a common generalized interconnect (i.e., bus 20). The processors pass messages over the interconnect indicating their desire to read from or write to memory locations. When an operation is placed on the interconnect, all of the other processors "snoop" (monitor) this operation and decide if the state of their caches can allow the requested operation to proceed and, if so, under what conditions. There are several bus transactions that require snooping and follow-up action to honor the bus transactions and maintain memory coherency. The snooping operation is triggered by the receipt of a qualified snoop request, generated by the assertion of certain bus signals. Instruction processing is interrupted only when a snoop hit occurs and the snoop state machine determines that an additional cache snoop is required to resolve the coherency of the offended sector.

This communication is necessary because, in systems with caches, the most recent valid copy of a given block of memory may have moved from the system memory 16 to one or more of the caches in the system (as mentioned above). If a processor (say 12a) attempts to access a memory location not present within its cache hierarchy, the correct version of the block, which contains the actual (current) value for the memory location, may either be in the system memory 16 or in one of more of the caches in another processing unit, e.g. processing unit 12b. If the correct version is in one or more of the other caches in the system, it is necessary to obtain the correct value from the cache(s) in the system instead of system memory.

For example, consider a processor, say 12a, attempting to read a location in memory. It first polls its own L1 cache (24 or 26). If the block is not present in the L1 cache, the request is forwarded to the L2 cache (30). If the block is not present in the L2 cache, the request is forwarded on to lower cache levels, e.g., the L3 cache. If the block is not present in the lower level caches, the request is then presented on the generalized interconnect (20) to be serviced. Once an operation has been placed on the generalized interconnect, all other processing units snoop the operation and determine if the block is present in their caches. If a given processing unit has the block requested by processing unit in its L1 cache, and the value in that block is modified, and any lower level caches also have copies of the block, then their copies are stale, since the copy in the processor's cache is modified. Therefore, when the lowest level cache (e.g., L3) of the processing unit snoops the read operation, it will determine that the block requested is present and modified in a higher level cache. When this occurs with an in-line cache structure, the L3 cache places a message on the generalized interconnect informing the processing unit that it must "retry" it's operation again at a later time, because the actual value of the memory location is in the L1 cache at the top of the memory hierarchy and must be retrieved to make it available to service the read request of the initiating processing unit.

Once the request from an initiating processing unit has been retried, the L3 cache begins a process to retrieve the modified value from the L1 cache and make it available at the L3 cache, main memory or both, depending on the exact details of the implementation. To retrieve the block from the higher level caches, the L3 cache sends messages through the inter-cache connections to the higher level caches, requesting that the block be retrieved. These messages propagate up the processing unit hierarchy until they reach the L1 cache and cause the block to be moved down the hierarchy to the lowest level (L3 or main memory) to be able to service the request from the initiating processing unit.

The initiating processing unit eventually re-presents the read request on the generalized interconnect. At this point, however, the modified value has been retrieved from the L1 cache of a processing unit and placed into system memory, and the read request from the initiating processor will be satisfied. The scenario just described is commonly referred to as a "snoop push". A read request is snooped on the generalized interconnect which causes the processing unit to "push" the block to the bottom of the hierarchy to satisfy the read request made by the initiating processing unit.

Thus, when a processor wishes to read or write a block, it must communicate that desire with the other processing units in the system in order to maintain cache coherency. To achieve this, the cache coherence protocol associates with each block in each level of the cache hierarchy, a status indicator indicating the current "state" of the block. The state information is used to allow certain optimizations in the coherency protocol that reduce message traffic on the generalized interconnect and the inter-cache connections. As one example of this mechanism, when a processing unit executes a read it receives a message indicating whether or not the read must be retried (i.e., reissued later). If the read operation is not retried, the message usually also includes information allowing the processing unit to determine if any other processing unit also has a still active copy of the block (this is accomplished by having the other lowest level caches give a "shared" or "not shared" indication for any read they do not retry). Therefore, a processing unit can determine whether any other processor in the system has a copy of the block. If no other processing unit has an active copy of the block, the reading processing unit marks the state of the block as "exclusive". If a block is marked exclusive it is permissible to allow the processing unit to later write to the block without first communicating with other processing units in the system because no other processing unit has a copy of the block. Therefore, it is possible for a processor to read or write a location without first communicating this intention onto the interconnection, but only where the coherency protocol has ensured that no other processor has an interest in the block.

The foregoing cache coherency technique is implemented in a specific protocol referred to as "MESI." In this protocol, a cache block can be in one of four states, "M" (Modified), "E" (Exclusive), "S" (Shared) or "I" (Invalid). Under the MESI protocol, each cache entry (e.g., a 32-byte sector) has two additional bits which indicate the state of the entry, out of the four possible states. Depending upon the initial state of the entry and the type of access sought by the requesting processor, the state may be changed, and a particular state is set for the entry in the requesting processor's cache. For example, when a sector is in the Modified state, the addressed sector is valid only in the cache having the modified sector, and the modified value has not been written back to system memory. When a sector is Exclusive, it is present only in the noted sector, and is consistent with system memory. If a sector is Shared, it is valid in that cache and in at least one other cache, all of the shared sectors being consistent with system memory. Finally, when a sector is Invalid, it indicates that the addressed sector is not resident in the cache.

A cache transaction may require any caches which currently contain a value to invalidate the corresponding cache lines. For example, when a processor or I/O device issues a store (write) operation for a particular memory block, any caches which have earlier copies of the block must invalidate, or "kill," those cache lines. Invalidation is similarly performed for a read-with-intent-to-modify (RWITM) transaction, to gain exclusive ownership of the cache line. Prior art instruction sets also include a transaction, such as the PowerPC™ "DClaim" bus transaction, that is used to claim a memory block in anticipation of a later store operation, which again requires invalidation of any currently valid lines.

The requirement to kill old cache lines can lead to inefficiencies, particularly when a memory block is held in a shared fashion among several caches (that is, caches of different processing units). If a cache issues a transaction requiring invalidation, one cache may issue a snoop response indicating that the first cache could proceed but, in the prior art, the cache (master) must wait for responses from all caches which contain the target block. Thus, if a first snoop response indicates that a value was held in the S, R or T states, the master must wait before completing its transaction until it receives confirmation from all caches, since the first snoop response inherently signifies that there are other caches that must be properly invalidated (in contrast to an M or E state response which would indicate that no other caches contain the target block). Oftentimes these other caches cannot immediately provide a snoop response, due to full snoop queues or other cache activity, and so a retry message is sent instead. The master must then reissue the request, sometimes repeatedly, before all of the snoop responses are collected, delaying the master transaction. This delay may actually be unnecessary, such as when the new value to be stored is the same as the old value that is currently in each of the caches. Moreover, the caches which invalidated their copies might need the value later, and so would have to re-read the cache line and create even more bus traffic.

In light of the foregoing, it would be desirable to provide an improved method of handling store operations in a multiprocessor computer system. It would be further advantageous if the method could reduce unnecessary system bus traffic.

SUMMARY OF THE INVENTION

It is therefore one object of the present invention to provide an improved method of maintaining cache coherency in a multiprocessor system.

It is another object of the present invention to provide such a method which reduces bus traffic by eliminating unnecessary coherency responses.

It is yet another object of the present invention to provide an improved method of store operations in a memory hierarchy of a computer system while ensuring the integrity of target memory blocks.

The foregoing objects are achieved in a method of handling a write operation in a multiprocessor computer system wherein each of a plurality of processing units has at least one respective cache, generally comprising the steps of issuing an instruction from a core of one of the processing units to store a new value in a memory block of the computer system, determining that the new value is the same as a current value contained in the memory hierarchy of the computer system which also corresponds to the memory block, and discarding the store instruction without issuing any associated cache operation in response to said determination. When a store hit occurs, the current value is retrieved from the local cache. When a store miss occurs, the current value is retrieved from a remote cache (or memory) by issuing a read request. The comparison may be performed using a portion of the cache line which is less than a granule size of the cache line. A store gathering queue can be use to collect pending store instructions that are directed to different portions of the same cache line.

The above as well as additional objectives, features, and advantages of the present invention will become apparent in the following detailed written description.

DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 2:
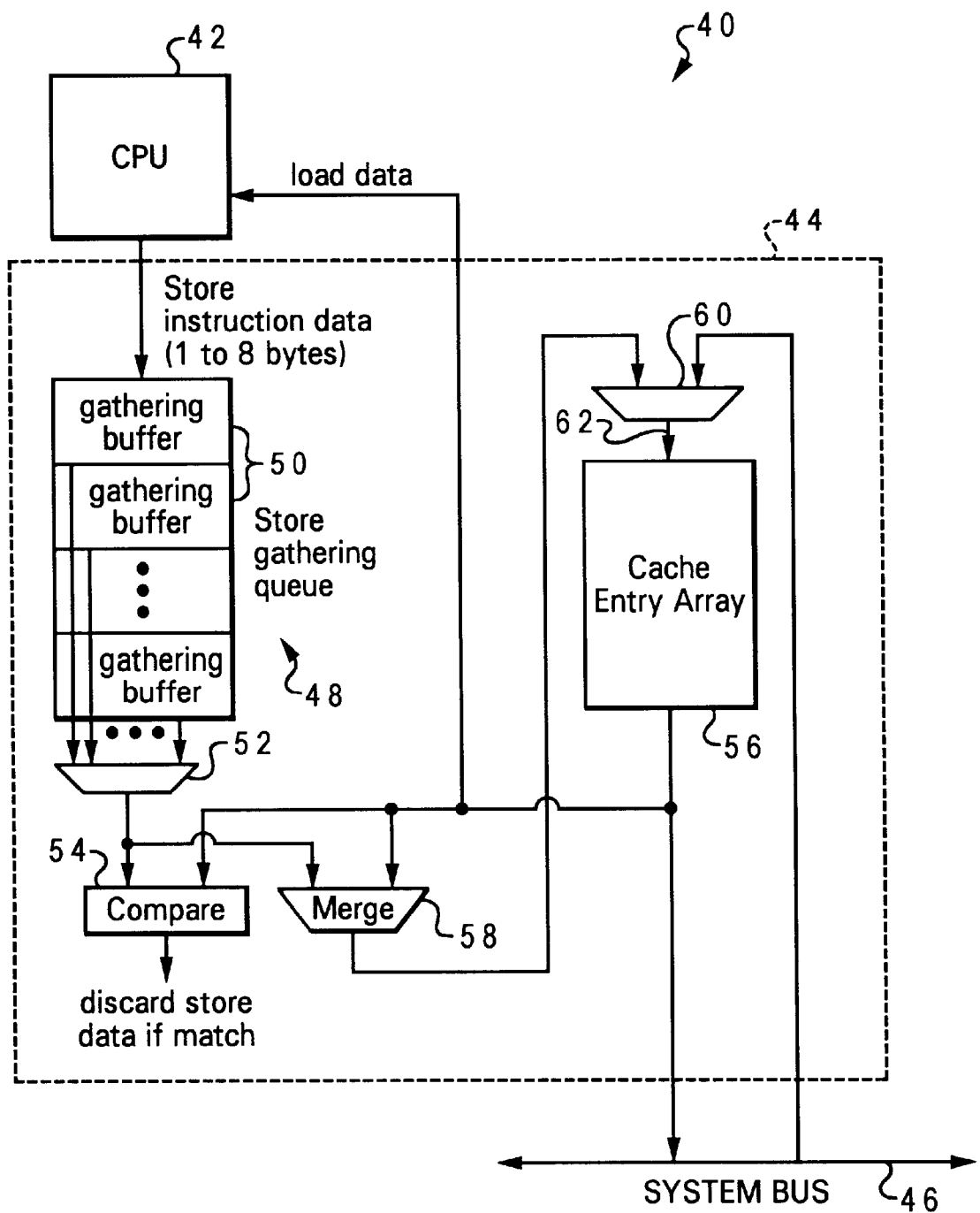
FIG. 2 is a block diagram of one embodiment of a processing unit used in a multiprocessor computer system, in accordance with the present invention.

With reference now to the figures, and in particular with reference to FIG. 2, there is depicted one embodiment 40 of a processing unit used in a multiprocessor computer system constructed in accordance with the present invention. Processing unit 40 is generally comprised of a central processing unit (CPU) or core 42, and a cache 44. Although FIG. 2 illustrates only a single cache for a given processing unit, it is understood that the present invention could be applied to multi-level cache hierarchies, i.e., the depicted cache could be an on-board (L1) cache, or could be an lower level (L2 or L3) cache.

Figure 1:
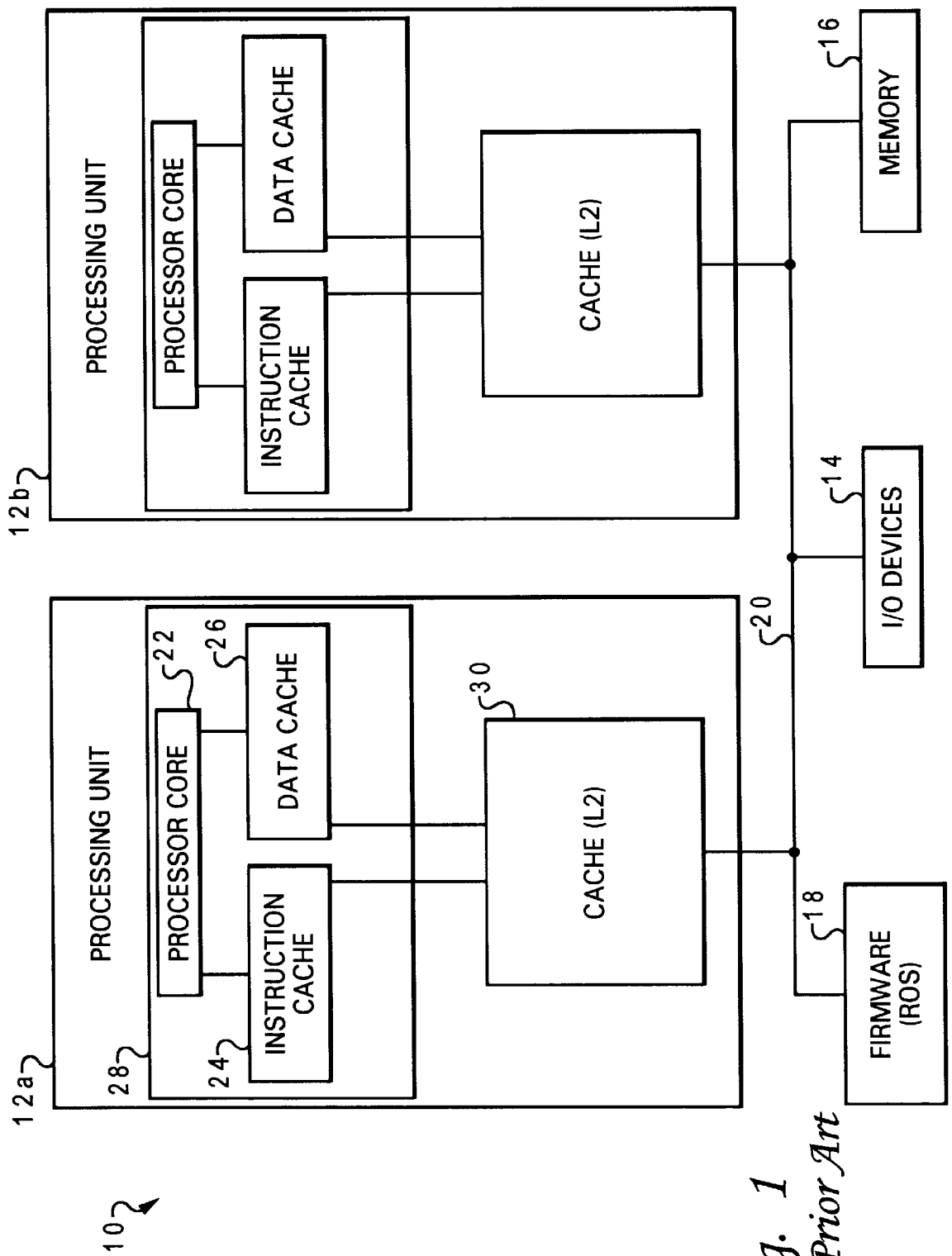
FIG. 1 is a block diagram of a prior art multiprocessor computer system.

In the illustrative embodiment, the multiprocessor computer system of the present invention is a symmetric multiprocessor (SMP) computer system, having a plurality of processing units each essentially identical to processing unit 40, and interconnected by a system bus 46. The multiprocessor computer system of the present invention may further include elements such as those shown in FIG. 1, but the present invention could be applied to computer systems that have additional hardware components not shown in FIG. 1, or having a different interconnection architecture (or both), so those skilled in the art will appreciate that the present invention is not limited to the generalized system shown in that figure.

The present invention is directed to a more efficient manner of handling store operations in a multiprocessor system which utilizes caches and cache coherency protocols. When a store instruction is issued from core 42, the new value being stored (typically operand data), is examined to see if it is the same as the old value that is currently stored in the memory hierarchy, before deciding whether further cache coherency activity is necessary.

When cache 44 receives the store instruction, it must first determine whether a valid copy of the value is currently contained in the cache. If so (a cache "hit"), the store data is compared with the data contained in cache 44. If the data is the same, then store operation may be discarded, with no required cache transactions or snoop operations. Even in a multi-level cache hierarchy, it would not be necessary to transmit any notifications to the lower level cache(s).

Depending on the operating system and the particular program application running on the computer, a significant number of store instructions could actually store the same data that already exists in the memory/cache subsystem. The present invention thus eliminates processing delays which might otherwise occur if the store operation were propagated throughout the cache hierarchy. If a requested value were present in a prior art cache in a shared coherency state, it would be necessary to issue a kill to the other caches to maintain proper coherency when a store instruction was executed, even if the store data is the same. The present invention not only avoids the direct delay of issuing the kill command on system bus 46, but also avoids the indirect memory latency associated with snoop responses and possible retry attempts.

The comparison of the store data can be performed on a per-instruction basis, or on a larger granule determined by, e.g., store queuing logic. In the depicted embodiment, cache 44 is provided with a store gathering queue 48 which can gather up to 64 bytes (first or second half of a 128-byte cache line) or store data using gathering buffers 50. The comparison is then performed on whatever amount of data has been gathered at the time that store queue entry must be victimized (committed to the cache). A portion of the address of each of the store instructions in store gathering queue 48 is examined by the queue logic to determine if any instructions are included in the same cache line. The data for these instructions is collected using a gate 52, and fed to a set of comparators 54. The other input to comparator circuit 54 comes from the cache entry array 56 of cache 44, which contains the data (or program instruction) for each cache line.

The output signal from comparator circuit 54 is used to control further handling of the store operation. If the comparison is positive, i.e., the data is the same, then the store operation is discarded, and it is not necessary for cache 44 to issue any coherency operations to the remainder of the memory hierarchy. This outcome is the same regardless of the coherency state of the target cache line (e.g., shared, modified, or exclusive). Also, the coherency state need not be changed. In other words, even if the previous value was shared or exclusive (consistent with system memory), the store operation does not necessarily result in a change to the modified state. In the case of a hierarchical cache, when a higher level cache (L1) writes a cache line back to a lower level cache (L2), the lower level cache can compare the full cache line to the lower level cache data.

The use of store gathering advantageously allows several store operations to be "collapsed" into the single operation, if they are directed to different portions of the same cache line. In other words, store instructions that were entered later into queue 48 are subsumed in the execution of an earlier store operation (whether the comparison is positive or negative), further reducing processor delays.

If the comparison by circuit 54 is negative, i.e., the data is not the same, then it is necessary to proceed with the usual coherency activity, viz., issue a kill or DClaim operation to system bus 46, and mark the cache line in cache 44 as being in the modified coherency state. The new data is entered into cache entry array 56 using a merge multiplexor 58. Merge multiplexor 58 gets the current cache line from entry array 56 and changes only the relevant bytes in the line. The new cache line is rewritten to entry array 56 from the output of merge multiplexor 58. Another multiplexor 60 controls access to the write port 62 of entry array 56, to allow writing by system bus 46 as well.

If the cache control logic initially determines that the store operation has "missed" cache 44 (i.e., a valid copy of the subject memory block is not currently present in the cache), then it is necessary to obtain the current valid value from elsewhere in the memory hierarchy. In this case, cache 44 first treats the store instruction as if it were a read instruction. Cache 44 issues a read operation to system bus 46 to retrieve the current data. The current data may be provided to system bus 46 by either the system memory device, or from another cache via intervention, using conventional snoop responses and protocols. The current data are then written into the cache. The current data are then read from the cache and compared to the store instruction data using comparison circuit 52. If the comparison is positive, then the data are marked with the appropriate coherency state (e.g., shared or exclusive). If, however, the store data do not match the read data, then cache 44 issues a DClaim transaction to system bus 46 for that cache line. In this latter case, the cache line is marked with a coherency state to indicate that the value is not consistent with system memory (e.g., modified).

For those store misses which do not change the data, the present invention has cache 44 issue only a read operation, which keeps other caches from unnecessarily invalidating the data. In this manner, if one of these other caches subsequently needs the data, it is still valid in that cache and does not have to be retrieved again, reducing overall processing time.

Those skilled in the art will appreciate that, while the present invention significantly reduces overall memory latency for procedures which frequently store data back to memory in an unchanged form, this approach might unduly degrade performance for certain other procedures which tend to often change data that is shared among processes. In this latter circumstance, a cache will first issue a read operation on a store miss, incur a delay, and then issue a DClaim when it is determined that the data is being changed; in other words, the read operation and its concomitant delay are superfluous. If this happens repeatedly, then the benefits of the present invention are not realized. A further refinement of the present invention accordingly allows the cache to programmably throttle back the use of this technique, i.e., to instead just use the prior art approach of issuing only a RWITM transaction to the bus.

This programmable feature of the invention may be implemented via either hardware or software controls. For example, hardware within cache 44 could monitor all store misses and have a programmable threshold or ratio for the number of times a store miss actually changes data. If the threshold is exceeded, then the invention is disabled and the prior art approach is used. Alternatively, software may be used to, e.g., provide a hint bit or flag with the store instruction which indicates that the store operation should be carried out assuming that the data will change. This hint bit can be provided by an extended instruction set, and implemented in either the operating system or a program application.

Figure 3:
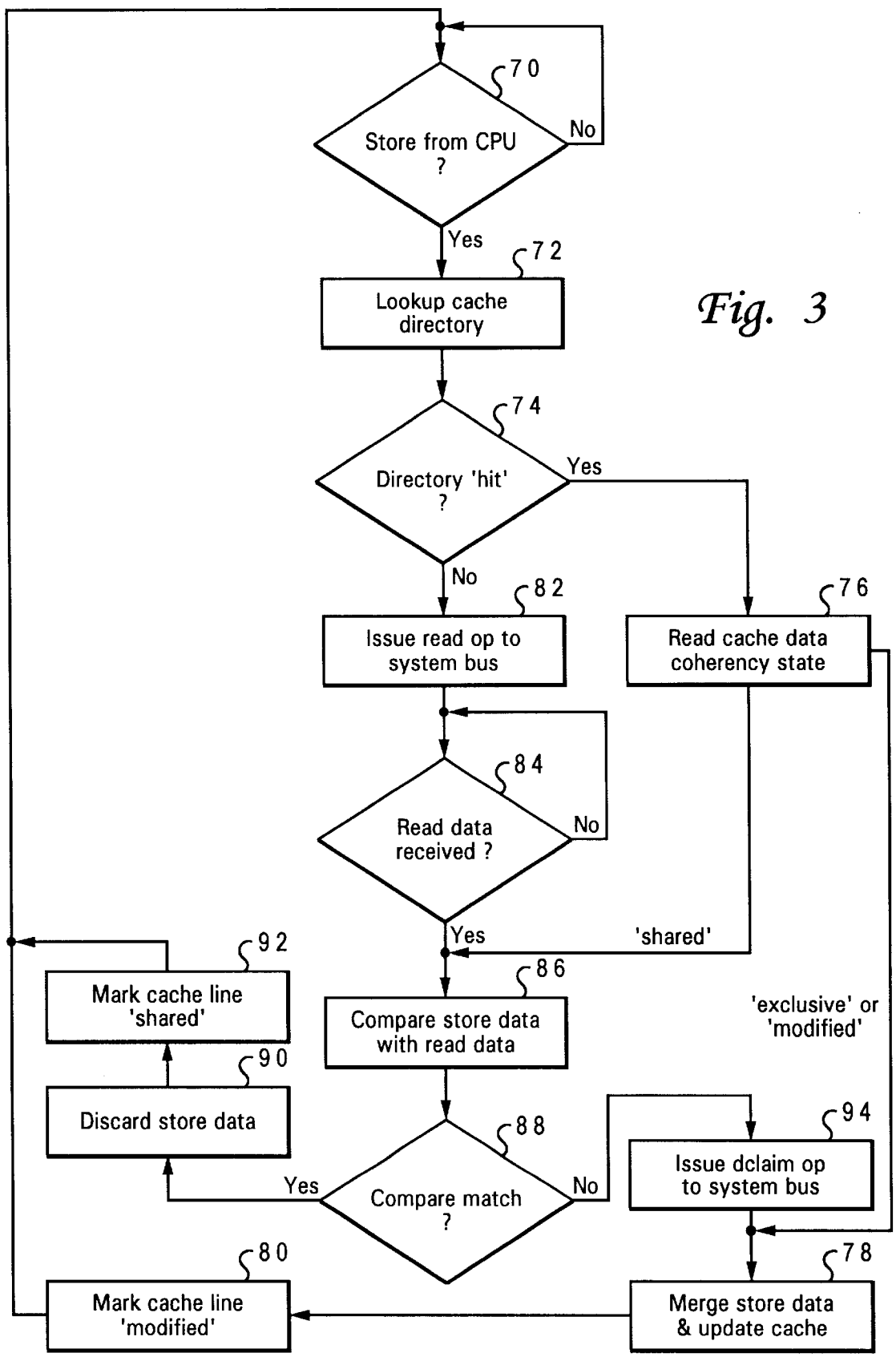
FIG. 3 is a chart of the logic flow in accordance with one implementation of the present invention, illustrating the handling of a store operation by the cache coherency system.

FIG. 3 illustrates the logic flow associated with the foregoing embodiment. The process begins with a store instruction from the core (70). The address of the store instruction is checked against the addresses in the cache directory (72), and a determination is made as to whether the store instruction hit or missed the cache (74). If a cache hit occurred, then the cache coherency state of the subject cache line is examined (76). If the coherency state is valid but not shared with other caches (e.g., modified or exclusive), then the data is merged and the cache updated (78), and the cache line is marked as modified (80). If the coherency state indicates that other caches contain the value (e.g., shared), then a comparison is performed of the new and existing data (86); if the data matches (88), then the store operation is discarded (90), and the cache line is marked as shared (92).

If step 74 indicates a cache miss, then a read operation is transmitted to the system bus (82), and the cache waits until the data is received (84). The data from the store instruction is then compared with the read data (86). If the data matches (88), then the store operation is discarded (90), and the cache line is marked as shared (92). If the data does not match, then a DClaim operation is issued to the system bus (94). The process then concludes with steps 78 and 80. The present invention thus results in more efficient processing by avoiding delays which might otherwise arise as a result of unnecessary system bus transactions associated with store operations.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of handling a write operation in a multiprocessor computer system wherein each of a plurality of processing units has at least one respective cache within a memory hierarchy of the computer system, said method comprising the steps of:

issuing an instruction from a core of one of the processing units to store a new value in the memory hierarchy of the computer system;

in response to said issuing step, determining that the new value is the same as a current value contained in the memory hierarchy; and in response to said determining step, discarding the store instruction without issuing any associated cache operation.

2. The method of claim 1 further comprising the step of searching a cache of the processing unit to locate the current value in a cache line of the cache.

3. The method of claim 2 further comprising the steps of:

loading the current value in the cache line; and marking the cache line with a shared coherency state.

4. The method of claim 2 further comprising the steps of:

loading the current value in the cache line; and marking the cache line with a modified coherency state.

5. The method of claim 2 wherein said determining step includes the step of comparing the new value to a portion of the cache line which is less than a granule size of the cache line.

6. The method of claim 5 wherein a plurality of store instructions are issued by the core, and said determining step includes the step of determining that at least two of the store instructions are directed to different portions of the cache line.

7. The method of claim 6 wherein said discarding step discards both of the at least two store instructions.

8. The method of claim 2 further comprising the step of identifying a coherency state of the cache line.

9. A computer system comprising:

a system memory device;

an interconnect coupled to said system memory device; and a plurality of processing units coupled to said interconnect, wherein each of said plurality of processing units has a respective one of a plurality of caches in a memory hierarchy of the computer system, said plurality of caches including;

coherency means, responsive to receipt of a store instruction requesting storage of a new value in the memory hierarchy, for determining that the new value is the same as a current value contained in the memory hierarchy, said coherency means discarding the store instruction, in response to said determination, without issuing any associated cache operation.

10. The computer system of claim 9 wherein said coherency means searches a cache of said processing unit to locate the current value in a cache line of said cache.

11. The computer system of claim 10 further comprising means for loading the current value in said cache line and for marking said cache line with a shared coherency state.

12. The computer system of claim 10 further comprising means for loading the current value in said cache line and for marking said cache line with a modified coherency state.

13. The computer system of claim 10 wherein said coherency means compares the new value to a portion of said cache line which is less than a granule size of said cache line.

14. The computer system of claim 13 wherein a plurality of store instructions are issued by said core, and said coherency means determines that at least two of the store instructions are directed to different portions of said cache line.

15. The computer system of claim 14 wherein said coherency means discards both of the at least two store instructions.

16. The computer system of claim 10 wherein said coherency means further identifies a coherency state of said cache line.

17. A processing unit, comprising:

a processor core; and a cache including coherency means that, responsive to receipt of a store request by the processor core to store a new value in a memory hierarchy including the cache, determines that the new value is the same as a current value contained in the memory hierarchy and that discards the store request responsive to said determination without issuing any associated cache operation.

18. A cache, comprising:

a data storage array; and coherency means that, responsive to receipt of a store request to store a new value in a memory hierarchy including the cache, determines that the new value is the same as a current value contained in the memory hierarchy and that discards the store request responsive to said determination without issuing any associated cache operation.

* * * * *